United States Patent
Nakamura

(10) Patent No.: US 6,733,741 B2
(45) Date of Patent: May 11, 2004

(54) METHOD AND APPARATUS FOR ACTIVATING A HYDROGEN-ABSORBING ALLOY

(75) Inventor: Kenji Nakamura, Toyota (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 188 days.

(21) Appl. No.: 09/945,715

(22) Filed: Sep. 5, 2001

(65) Prior Publication Data

US 2002/0028176 A1 Mar. 7, 2002

(30) Foreign Application Priority Data

Sep. 5, 2000 (JP) .................................. 2000-268742

(51) Int. Cl.[7] ........................ C01B 3/50; C01B 6/34
(52) U.S. Cl. ........................ 423/658.3; 422/190; 429/19
(58) Field of Search ................. 422/190; 423/658.3; 429/19, 20

(56) References Cited

FOREIGN PATENT DOCUMENTS

| JP | 63-306367 | | 12/1988 | |
|---|---|---|---|---|
| JP | 05-163001 | | 6/1993 | |
| JP | 08233394 A | * | 9/1996 | ........... F25B/17/12 |
| JP | 10-183317 | | 7/1998 | |
| JP | 2000-017408 | | 1/2000 | |

* cited by examiner

*Primary Examiner*—Stanley S. Silverman
*Assistant Examiner*—Maribel Medina
(74) *Attorney, Agent, or Firm*—Kenyon & Kenyon

(57) ABSTRACT

The present invention provides a method and apparatus for activating a hydrogen-absorbing alloy. An embodiment of the present invention includes, compressing and supplying hydrogen from a first container in a hydrogen release condition to a second container in a hydrogen absorption condition via hydrogen piping, which connects the first and second containers, and supplying heat released from the second container to the first container via heating medium piping, which connects the first and second containers, and reversing the hydrogen flow direction and heat supply direction.

22 Claims, 2 Drawing Sheets

METHOD AND APPARATUS FOR ACTIVATING A HYDROGEN-ABSORBING ALLOY

BACKGROUND OF THE INVENTION

1. Field of the Invention

The present invention relates to a method and apparatus for activating a hydrogen-absorbing alloy.

2. Description of the Related Art

A hydrogen-absorbing alloy is defined as a solid metal hydride (hereinafter, MH) capable of absorbing and desorbing hydrogen in the form of atoms in its crystal structure. Where a hydrogen-absorbing alloy is used for the storage of hydrogen, the hydrogen-absorbing alloy has to be activated before use by causing the hydrogen-absorbing alloy to absorb and release hydrogen repeatedly over several tens of cycles. When the hydrogen-absorbing alloy absorbs hydrogen, it expands and changes to reveal new surfaces, which promote changing the alloy into an active metal hydride.

Japanese Patent Publication No. 2000-17408 discloses one method for activating a hydrogen-absorbing alloy, in which an interior of a container (MH container) containing the hydrogen-absorbing alloy is held at a low pressure and a high temperature during release of hydrogen from the hydrogen-absorbing alloy. In contrast, during absorption of hydrogen by the hydrogen-absorbing alloy, the interior of the container is held at a high pressure and low temperature.

However, in the above conventional method, the hydrogen used for activating the hydrogen-absorbing alloy is not reused in a succeeding activation cycle. The hydrogen is supplied from an external hydrogen source to the MH container where the hydrogen is absorbed by the hydrogen-absorbing alloy in the container. However, after the hydrogen is released from the hydrogen-absorbing alloy, it is exhausted to atmosphere or is mixed with air to be burnt. As a result, to activate a hydrogen-absorbing alloy in an MH container of a volume of about 20 $m^3$, hydrogen of a volume of about 200–1000 $m^3$ is necessary. Further, since thermal energy is consumed independently in heating and cooling the interior of the MH container, the heat generated by the hydrogen-absorbing alloy during hydrogen absorption is not used to heat the hydrogen-absorbing alloy during hydrogen release.

SUMMARY OF THE INVENTION

An object of the present invention is to provide a method and apparatus for activating a hydrogen-absorbing alloy where an amount of hydrogen and an amount of thermal energy consumed during activation is greatly decreased.

BRIEF DESCRIPTION OF THE DRAWINGS

The above and other objects, features, and advantages of the present invention will become more apparent and will be more readily appreciated from the following detailed description of the preferred embodiments of the present invention in conjunction with the accompanying drawings, in which.

DETAILED DESCRIPTION OF THE PREFERRED EMBODIMENT

Figure 1:
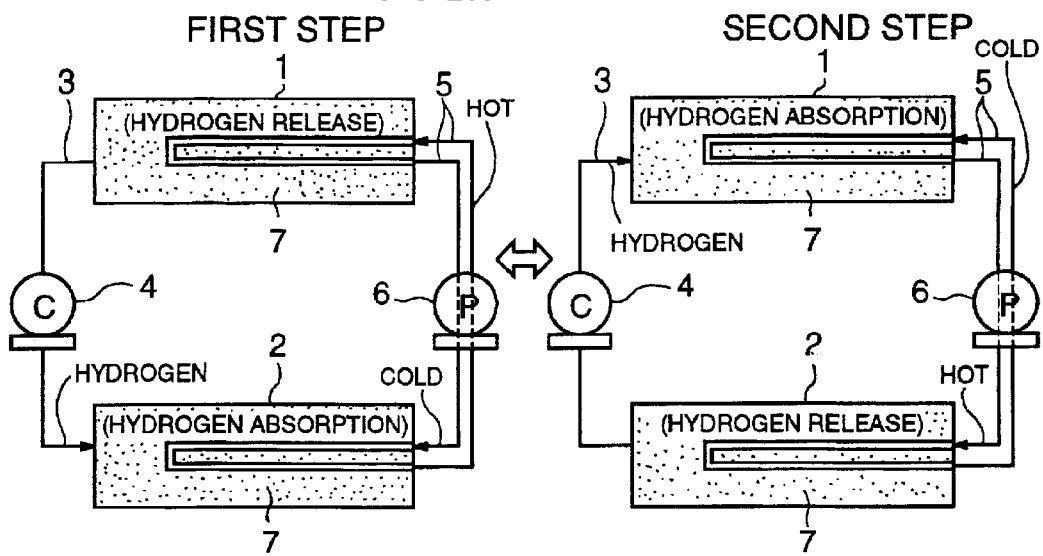
FIG. 1 is a system diagram illustrating a method and apparatus for activating a hydrogen-absorbing alloy according to a first embodiment of the present invention.

FIG. 1 illustrates a method and apparatus according to a first embodiment of the present invention.

An apparatus shown in FIG. 1 is used to activate a hydrogen-absorbing alloy. The apparatus includes a plurality of containers including a first container 1 and a second container 2, each container containing a hydrogen-absorbing alloy 7 therein. The apparatus further includes hydrogen piping (piping in which hydrogen flows) 3, which connects the first container 1 and the second container 2 to each other, and a hydrogen compressor (a compressor compressing hydrogen) 4 disposed in the hydrogen piping 3. FIG. 1 also shows heating medium piping (piping in which a heating medium flows) 5 heat-exchangeably connecting the first container 1 and the second container 2 to each other, and a heating medium pump (a pump pumping the heating medium) 6 disposed in the heating medium piping 5.

Though FIG. 1 illustrates an embodiment including a first container 1 and a second container 2, the number of containers is not intended to be limiting. The containers contain hydrogen-absorbing alloy 7 which is to be activated. In at least one but not all of the containers 1 and 2, an already activated hydrogen-absorbing alloy may be contained.

The hydrogen piping 3 connects the interiors of containers 1 and 2, providing hydrogen contact to the hydrogen-absorbing alloy 7.

The heating medium piping 5 extends through containers 1 and 2, but the hydrogen-absorbing alloy is isolated from the heating medium by a wall. Therefore the heating medium does not contact the hydrogen-absorbing alloy. The heating medium piping 5 is a closed system in which the heating medium is circulated by the heating medium pump 6. The heating medium for example can be water.

The first and second containers 1 and 2 alternately become hydrogen release-side containers and hydrogen absorption-side containers depending on the exchange in flow direction of the hydrogen in the hydrogen piping 3.

The flow direction of the heating medium (water) is constant, but the heat supply direction changes according to which container, 1 or 2, is the hydrogen release-side container or the hydrogen absorption-side container. The heating medium is hot at about 80° C. at the inlet of the hydrogen release-side container to the hydrogen-absorbing alloy releasing hydrogen, the heating medium loses thermal energy in the hydrogen release-side container due to the hydrogen-absorbing alloy absorbing heat. The heating medium is cold at about −5° C. at the outlet of the hydrogen release-side container.

The cold heating medium flows to the hydrogen absorption-side container at about −5° C. The heating medium is warmed at the hydrogen absorption-side container due to the hydrogen-absorbing alloy releasing heat it absorbs hydrogen. The heating medium is hot at about 80° C. of the hydrogen absorption-side container and circulates to the hydrogen-release side container.

The hydrogen compressor 4 is a reversible compressor and can reverse the directions of flow and compression of the hydrogen flowing in the hydrogen piping 3.

The hydrogen compressor 4 pressurizes the interior of the hydrogen absorption-side container to about 5–10 MPa. The pressure of the hydrogen release-side container is about 0.3–0.6 MPa in average.

A method for activating hydrogen-absorbing alloy according to the first embodiment of the present invention will now be explained with reference to FIG. 1.

As illustrated in the left half of FIG. 1, hydrogen from the first container 1, which is in a hydrogen release condition is compressed by the hydrogen compressor 4 and is supplied to the second container 2, which is in a hydrogen absorption condition via the hydrogen piping 3. Heat released from the second container 2, which is in a hydrogen absorption condition is supplied to the first container 1, which is in a hydrogen release condition via the heating medium piping 5, whereby release of hydrogen, which requires thermal energy in the first container 1 is promoted.

As further illustrated in the right half of FIG. 1, the hydrogen flow direction and the heat supply direction (not the heating medium flow direction) are reversed compared with those of the step above. At this step, hydrogen from the second container 2, which is in a hydrogen release condition is compressed by the hydrogen compressor 4 and is supplied to the first container 1, which is in a hydrogen absorption condition via the hydrogen piping 3. Heat released from the first container 1, which is in a hydrogen absorption condition is supplied to the second container 2, which is in a hydrogen release condition via the heating medium piping 5, whereby release of hydrogen in the second container 2 is promoted.

In one embodiment, the steps are performed once each. Alternately, by conducting each step a plurality of times, both the hydrogen-absorbing alloy in the first container 1 and the hydrogen-absorbing alloy in the second container 2 can be activated.

In an embodiment where one of the first containers 1 or 2 contains an already activated hydrogen-absorbing alloy and the other container 1, or 2, contains hydrogen-absorbing alloy, which needs to be activated, the speed, amount of hydrogen, and the heat per cycle flowing from one container to the other container increases and shortens the time for activating the hydrogen-absorbing alloy.

Since the plurality of containers communicate with each other via the hydrogen piping 3, the hydrogen released from one container is used as the hydrogen absorbed in the other container, therefore with the present invention the hydrogen can be repeatedly used. As a result, compared with the conventional method where the hydrogen released from the hydrogen-absorbing alloy is exhausted to the atmosphere, the amount of hydrogen required for activation of the hydrogen-absorbing alloy can be decreased to one tenth (1/10) or less of the amount of hydrogen required in the conventional method.

Further, since the plurality of containers are heat-exchangeably connected to each other via the heating medium piping 5, the heat released at the hydrogen absorption-side container can be used in the other container, so that the thermal energy required for activating the hydrogen-absorbing alloy can be decreased.

Next, a method and apparatus for activating a hydrogen-absorbing alloy according to a second embodiment of the present invention will be explained with reference to FIG. 2. Similar elements will be denoted by similar reference numerals.

A method and apparatus for activating a hydrogen-absorbing alloy according to the second embodiment of the present invention is the same as that according to the first embodiment of the present invention except that in the second embodiment the closed heating medium piping 5 for circulating the heating medium from the container 1 to the container 2 are removed, therefore in the second embodiment the heating and cooling of container Sand container 2 are conducted independently from each other.

Specifically, the apparatus for activating a hydrogen-absorbing alloy according to the second embodiment of the present invention includes a plurality of containers 1 and 2 including a first container 1 and a second container 2, each container containing a hydrogen-absorbing alloy 7 therein. Hydrogen piping 3 connects the first container 1 and the second container 2 to each other, and a hydrogen compressor 4 is disposed in the hydrogen piping 3.

The hydrogen-absorbing alloy 7 in containers 1 and 2 contacts hydrogen. One of the containers 1 or 2 can contain an activated hydrogen absorbing alloy while the other container 1, or 2, can contain a non-activated hydrogen-absorbing alloy.

Figure 2:
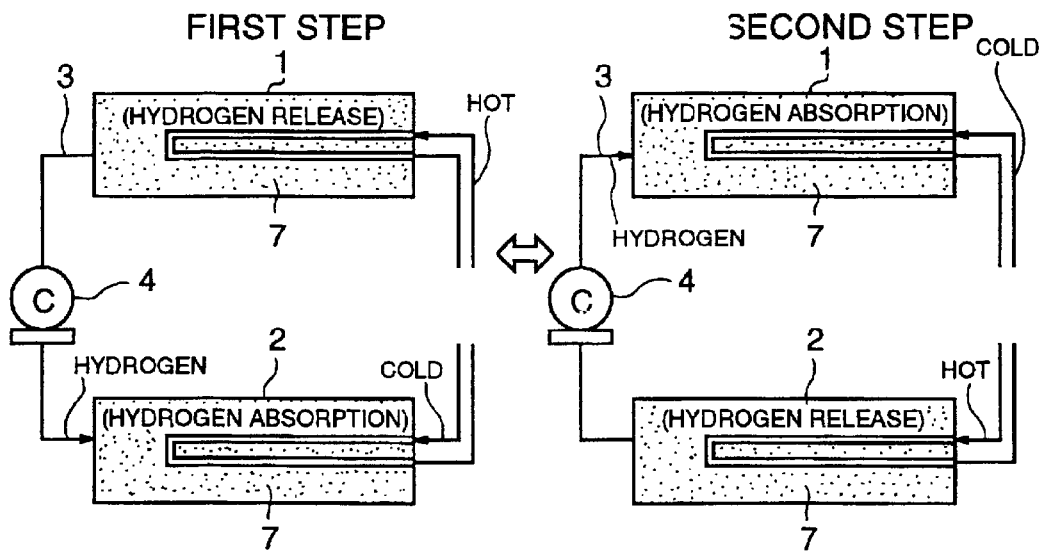
FIG. 2 is a system diagram illustrating a method and apparatus for activating a hydrogen-absorbing alloy according to a second embodiment of the present invention.

Anther embodiment of the method of the present invention is shown in FIG. 2. As illustrated in the left half of FIG. 2, hydrogen from the first container 1, which is in a hydrogen release condition, is compressed by the hydrogen compressor 4 and is supplied to the second container 2, which is in a hydrogen absorption condition, via the hydrogen piping 3. Heat from an external heat source can be supplied to the first container 1, which is in a hydrogen release condition, whereby release of hydrogen in the first container 1 is promoted.

As illustrated in the right half of FIG. 2, the flow directions of the hydrogen are reversed compared with that of the above step. At this step, hydrogen from the second container 2, which is in a hydrogen release condition, is compressed by the hydrogen compressor 4 and is supplied to the first container 1, which is in a hydrogen absorption condition, via the hydrogen piping 3. Heat from an external heat source can be supplied to the second container 2, whereby release of hydrogen from the second container 2 is promoted.

Since the plurality of containers 1 and 2 communicate with each other via hydrogen piping 3, hydrogen released from one container can be used as hydrogen to be absorbed at the other container—thus hydrogen can be repeatedly used. As a result, compared with the conventional method where the hydrogen released from the hydrogen-absorbing alloy is exhausted to the atmosphere, the amount of hydrogen required for activation of the hydrogen-absorbing alloy in the present invention can be decreased to one tenth (1/10) or less of the amount of hydrogen required in the conventional method.

Hydrogen released from the hydrogen-absorbing alloy can be used as fuel, which can be supplied to an anode of a polymer electrolyte fuel cell (hereinafter, PEFC). The fuel cell is mounted to, for example, a vehicle. However, the PEFC 10 shown in FIG. 3 may be used for other purposes than a vehicle.

Figure 3:
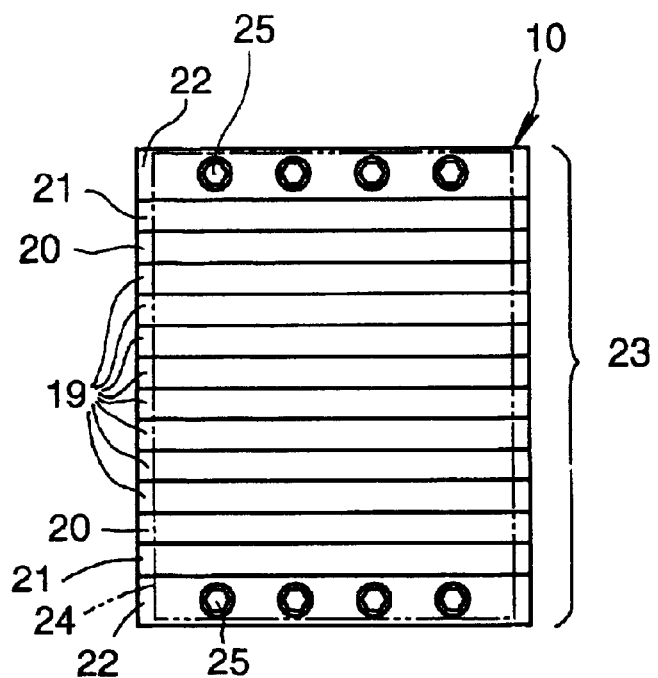
FIG. 3 is an elevational view of a fuel cell, as a hydrogen source of which the hydrogen-absorbing alloy according to the present invention can be applied.
Figure 4:
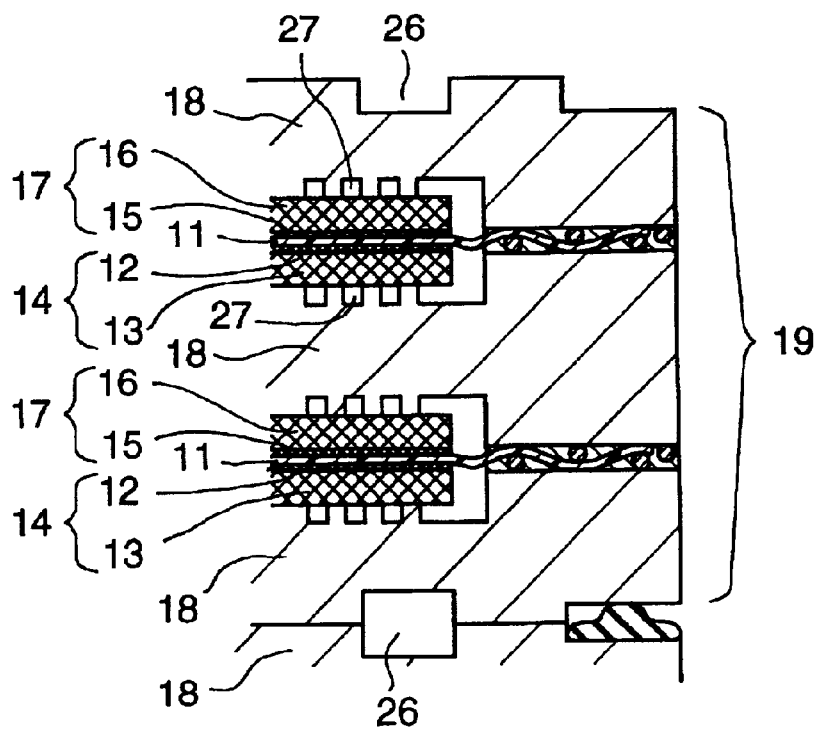
FIG. 4 is a partial, enlarged cross-sectional view of one portion of the fuel cell of FIG. 3.

As illustrated in FIGS. 3 and 4, the PEFC 10 includes a stack 23 of individual fuel cells. Each fuel cell includes a membrane-electrode assembly (MEA) and a separator 18. The MEA includes an electrolyte membrane 11 and a pair of electrodes disposed on opposite sides of the electrolyte membrane 11. The pair of electrodes include an anode 14 provided on one side of the membrane 11 and constructed of a first catalyst layer 12 and a first diffusion layer 13, and a cathode 17 provided on the other side of the membrane 11 and constructed of a second catalyst layer 15 and a second diffusion layer 16. The separator 18 has a passage 27 formed therein for supplying fuel gas (hydrogen) to the anode 14 and oxidant gas (oxygen, usually, air) to the cathode 17. The passage 26 formed in the separator 18 allows cooling water to flow. At least one fuel cell or a plurality of fuel cells form a module 19. A number of fuel cells are layered, with electrical terminals 20, electrical insulators 21, and end plates 22 disposed at opposite ends of the layers of fuel cells. After tightening the stack of fuel cells between the opposite end plates 22 in a fuel cell stacking direction, the end plates 22 are coupled to a fastening member 24 (for example, a tension plate) extending in a fuel cell stacking direction outside the layers of fuel cells by bolts 25 extending perpendicularly to the fuel cell stacking direction, to construct a stack 23 of fuel cells.

In the PEFC 10, at the anode 14, hydrogen is changed to positively charged hydrogen ions and electrons. The hydrogen ions move through the electrolyte membrane 11 to the cathode 17 where the hydrogen ions react with oxygen supplied and electrons (which are generated at an anode of the adjacent MEA and move to the cathode of the instant MEA through a separator) supplied to form water as follows:

At the anode: $H_2 \rightarrow 2H^+ + 2e^-$

At the cathode: $2H^+ + 2e^- + (\frac{1}{2})O_2 \rightarrow H_2O$

For the PEFC 10, hydrogen as a fuel has to be supplied to the anode 14. There are the following methods for supplying hydrogen:

(a) to supply hydrogen released from a hydrogen-absorbing alloy which has absorbed hydrogen beforehand;

(b) to supply hydrogen from a high-pressure container to which hydrogen has been compressed and contained beforehand; and (c) to supply hydrogen which is produced by reforming other fuels, such as methanol and gasoline.

In the case where a hydrogen-absorbing alloy is used for absorption of hydrogen, the hydrogen-absorbing alloy in powder form is inserted into a container where hydrogen is absorbed, and then the container is mounted on a vehicle. The hydrogen-absorbing alloy contained in the container has to be activated before it is used. This is done by absorbing and desorbing hydrogen for several or tens of cycles using the present invention.

Although the present invention has been described with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the sprit and scope of the present invention as defined by the following claims.

What is claimed is:

1. A method for activating a hydrogen-absorbing alloy comprising:

(a) providing a plurality of containers including a first container and a second container communicating with each other via hydrogen piping and heat-exchangeably connected to each other via heating medium piping;

(b) providing said hydrogen-absorbing alloy in each container, said hydrogen-absorbing alloy in at least one of the first and second containers being in a not-yet-activated state;

(c) compressing and supplying hydrogen from said first container, which is in a hydrogen release condition to said second container, which is in a hydrogen absorption condition via said hydrogen piping, and supplying heat released from said second container, which is in a hydrogen absorption condition to said first container, which is in a hydrogen release condition via said heating medium piping; and (d) reversing the hydrogen flow direction and the heat supply direction to compress and supply hydrogen from said second container, which is in a hydrogen release condition to said first container, which is in a hydrogen absorption condition via said hydrogen piping, and to supply heat released from said first container, which is a hydrogen absorption condition to said second container, which is in a hydrogen release condition via said heating medium piping.

2. A method according to claim 1, further comprising providing a reversible hydrogen compressor in said hydrogen piping.

3. A method for activating a hydrogen-absorbing alloy comprising:

(a) providing a plurality of containers including a first container and a second container communicating with each other via hydrogen piping and heat-exchangeably connected to each other via heating medium piping;

(b) providing said hydrogen absorbing alloy in each container, said hydrogen-absorbing alloy in at least one of the first and second containers being in a not-yet-activated state;

(c) compressing and supplying hydrogen from said first container, which is in a hydrogen release condition to said second container, which is in a hydrogen absorption condition via said hydrogen piping, and supplying heat released from said second container, which is in a hydrogen absorption condition to said first container, which is in a hydrogen release condition via said heating medium piping;

(d) reversing the hydrogen flow direction and the heat supply direction to compress and supply hydrogen from said second container, which is in a hydrogen release condition to said first container, which is in a hydrogen absorption condition via said hydrogen piping, and to supply heat released from said first container, which is in a hydrogen absorption condition to said second container, which is in a hydrogen release condition via said heating medium piping; and (e) repeating steps (c) and (d) at least two times.

4. A method according to claim 3, wherein said hydrogen-absorbing alloy contacts hydrogen.

5. A method according to claim 3, wherein said hydrogen-absorbing alloy is isolated from a heating medium.

6. A method according to claim 3, wherein one of said first and said second containers contains a hydrogen-absorbing alloy already activated and wherein the other of said first container and said second container contains a hydrogen-absorbing alloy to be activated.

7. A method according to claim 3, further comprising providing a reversible hydrogen compressor in said hydrogen piping.

8. A method for activating a hydrogen-absorbing alloy comprising:

(a) providing said hydrogen-absorbing alloy being contained in a plurality of containers including a first container and a second container communicating with each other via hydrogen piping;

(b) providing said hydrogen-absorbing alloy in each container, said hydrogen-absorbing alloy in at least one of the first and second containers being in a not-vet-activated state;

(c) compressing and supplying hydrogen from said first container, which is in a hydrogen release condition to said second container, which is in a hydrogen absorption condition via said hydrogen piping; and (d) reversing the hydrogen flow direction to compress and supply hydrogen from said second container, which is in a hydrogen release condition to said first container, which is in a hydrogen absorption condition via said hydrogen piping.

9. A method according to claim 8, further comprising providing a reversible hydrogen compressor in said hydrogen piping.

10. A method for activating a hydrogen-absorbing alloy comprising:

(a) providing a plurality of containers including a first container and a second container communicating with each other via a hydrogen piping;

(b) providing said hydrogen-absorbing alloy in each container, said hydrogen-absorbing alloy in at least one of the first and second containers being in a not-yet-activated state;

(c) compressing and supplying hydrogen from said first container, which is in a hydrogen release condition to said second container, which is in a hydrogen absorption condition via said hydrogen piping;

(d) reversing the hydrogen flow direction to compress and supply hydrogen from said second container, which is in a hydrogen release condition to said first container, which is in a hydrogen absorption condition via said hydrogen piping; and (e) repeating steps (c) and (d) at least twice.

11. A method according to claim 10, wherein said hydrogen-absorbing alloy contacts hydrogen.

12. A method according to claim 10, wherein one of said first and said second containers contains a hydrogen-absorbing alloy already activated and wherein the other of said first container and said second container contains a hydrogen-absorbing alloy to be activated.

13. A method according to claim 10, further comprising providing a reversible hydrogen compressor in said hydrogen piping.

14. An apparatus for activating a hydrogen-absorbing alloy comprising:

a plurality of containers including a first container and a second container wherein each container contains a hydrogen-absorbing alloy therein, said hydrogen-absorbing alloy in at least one of the first and second containers being in a not-yet-activated state;

hydrogen piping connecting said first container and said second container to each other;

a hydrogen compressor disposed in said hydrogen piping;

heating medium piping heat-exchangeably connecting said first container and said second container to each other; and a heating medium pump disposed in said heating medium piping.

15. An apparatus according to claim 14, wherein said hydrogen-absorbing alloy contacts hydrogen.

16. An apparatus according to claim 14, wherein said hydrogen-absorbing alloy is isolated from a heating medium.

17. An apparatus according to claim 14, wherein one of said first and said second containers contains a hydrogen-absorbing alloy already activated and wherein the other of said first container and said second container contains a hydrogen-absorbing alloy to be activated.

18. An apparatus according to claim 14, wherein said hydrogen compressor is a reversible compressor.

19. An apparatus for activating a hydrogen-absorbing alloy comprising:

a plurality of containers including a first container and a second container wherein each container contains a hydrogen-absorbing alloy therein, said hydrogen-absorbing alloy in at least one of the first and second containers being in a not-yet-activated state;

hydrogen piping connecting said first container and said second container to each other; and a hydrogen compressor disposed in said hydrogen piping.

20. An apparatus according to claim 19, wherein said hydrogen-absorbing alloy contacts hydrogen.

21. An apparatus according to claim 19, wherein one of said first and said second containers contains a hydrogen-absorbing alloy already activated and wherein the other of said first container and said second container contains a hydrogen-absorbing alloy to be activated.

22. An apparatus according to claim 19, wherein said hydrogen compressor is a reversible compressor.

* * * * *